(No Model.)

C. C. NASH.
PORTABLE WATER CLOSET.

No. 311,443. Patented Jan. 27, 1885.

WITNESSES:
Dexter M. Small
Joseph H. Perkins

INVENTOR:
Chas. C. Nash

UNITED STATES PATENT OFFICE.

CHARLES C. NASH, OF PROVIDENCE, RHODE ISLAND, ASSIGNOR TO D. M. SMALL, OF SAME PLACE.

PORTABLE WATER-CLOSET.

SPECIFICATION forming part of Letters Patent No. 311,443, dated January 27, 1885.

Application filed October 17, 1883. (No model.)

*To all whom it may concern:*

Be it known that I, CHARLES C. NASH, of Providence, county of Providence, and State of Rhode Island, have invented an Improved Portable Water-Closet or Commode, of which the following is a specification.

Figure 2:
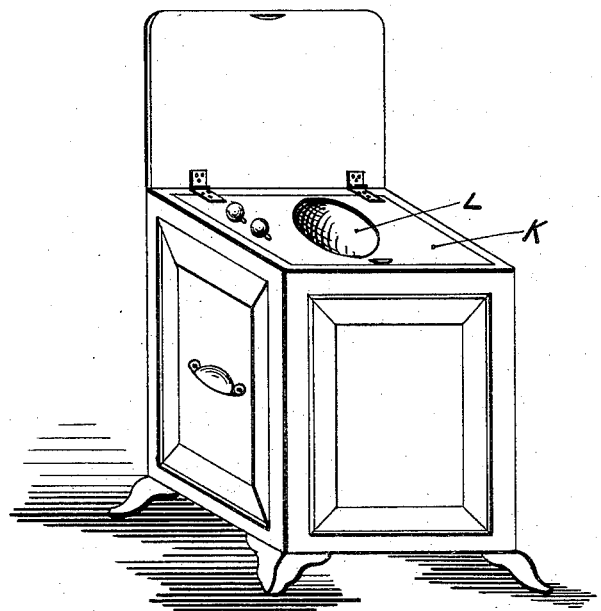
Figure 1:
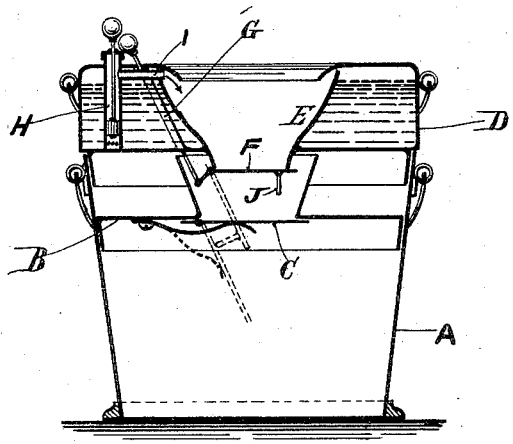

Figure 1 of the accompanying drawings, which form a part of this specification, shows a vertical section of the same through the center without the wooden casing, which is shown perspectively in Fig. 2.

In brief, my invention consists of a portable water-closet composed of two distinct and detachable parts—an upper part consisting of a water-tank, bowl with trap or valve thereto, and device for forcing water into the bowl, and a lower part or slop-chamber having a cover with a supplementary trap or valve therein to prevent the escape of odor when the upper part is removed, the object being to avoid the necessity of carrying the tank with the slop-chamber when the latter is to be emptied.

My invention also consists of a commode, with this upper part secured to the under side of the cover thereof, so that when the cover is raised this is raised with it, leaving the slop-chamber free to be removed.

In Fig. 1, A represents a slop pail or chamber, with a cover, B, which shuts down into it, as represented, leaving a space between it and the top of the pail. In the center of this cover there is an opening with a valve, C, thereto, which closes automatically by means of a spring or other suitable device.

D is a water-tank with a flange or rim, which also shuts down into the pail A above the cover B.

E is a bowl extending down through this tank; F, a valve or trap thereto; G, the device for operating the same; H, a pump for forcing the water from the tank through the pipe I into the bowl. When the trap F is opened, as indicated by the dotted lines, it opens the trap C also by means of the little pin J, which presses against it, overcoming the spring or other device which automatically closes it, as stated, when the pressure is removed. Both traps or valves thus open and close simultaneously. I do not, however, confine myself to this or to any particular device for operating them.

Fig. 2 shows the outer casing of the device having two covers, the tank D being secured to the under side of the cover K, which has an aperture, L, directly over the bowl, together with two little apertures at the side for the pump and trap handles; and without being confined to any particular construction of the different parts,

What I claim as new, and desire to secure by Letters Patent, is—

1. A portable water-closet composed of two detachable parts, the upper part consisting of a water-tank, bowl with valve thereto, and device for forcing water therein from the tank, and the lower part consisting of a slop-chamber with a tight-fitting cover thereto, and with an opening therein covered by a valve with device for operating the same, all substantially as set forth.

2. The combination, with a portable water-closet, of a detachable slop-chamber supplied with a tight-fitting cover having an aperture therein, to which is secured a valve distinct from the cover, that closes automatically, for the purpose set forth.

CHAS. C. NASH.

Witnesses:
JOSEPH H. PERKINS,
DEXTER M. SMALL.